United States Patent [19]

McKee et al.

[11] Patent Number: 5,477,531
[45] Date of Patent: Dec. 19, 1995

[54] METHOD AND APPARATUS FOR TESTING A PACKET-BASED NETWORK

[75] Inventors: Neil H. McKee, Horfield; Peter Phaal, Bradley Stoke, both of England

[73] Assignee: Hewlett-Packard Company, Palo Alto, Calif.

[21] Appl. No.: 162,114

[22] PCT Filed: May 28, 1992

[86] PCT No.: PCT/GB92/00967

§ 371 Date: Dec. 13, 1993

§ 102(e) Date: Dec. 13, 1993

[87] PCT Pub. No.: WO92/22967

PCT Pub. Date: Dec. 23, 1992

[30] Foreign Application Priority Data

Jun. 12, 1991 [EP] European Pat. Off. .............. 91305315

[51] Int. Cl.$^6$ ................................ H04J 3/26; H04L 1/14; H04L 12/26
[52] U.S. Cl. ................................ 370/17; 370/60; 370/94.1
[58] Field of Search .................................. 370/13, 17, 60, 370/60.1, 94.1, 94.2; 371/20.1, 20.2

[56] References Cited

U.S. PATENT DOCUMENTS 4,551,833  11/1985  Turner .
5,101,402  3/1992  Chui et al. ................................ 370/17
5,343,465  8/1994  Khalil ........................................ 370/17

OTHER PUBLICATIONS

"Measuring a Local Network's Performance", by P. D. Amer et al, Data Communications, vol. 12, No. 4, Apr. 1983, pp. 173–182.
"Statistical Monitors for Local Area Networks", D. C. Feldmeier, 11th Conference on Local Computer Networks, Oct. 8, 1986, pp. 142–146.
"Internetworking With TCP/IP", by Douglas Comer, 2nd edition 1991, Prentice–Hall International, Inc.

*Primary Examiner*—Wellington Chin

[57] ABSTRACT

In packet-based networks (10), it is often desired to test communications between two specific stations (11, 12). This can generally be effected from a first one of the stations (11) by requesting the other station (12) to 'loop-back' a test packet sent from the first station. The first station (11), on receiving back the test packet, can thereby ascertain that not only is communication with the other station (12) possible, but it can also measure the round trip time. However, more complex characteristics of the transmission path between the stations (11, 12) are not ascertainable in this manner. The transmission of a predetermined sequence of packets permits such characteristics to be determined by observing the effect of the network (10) on the sequence considered as a whole. Thus by varying packet size in a sequence, characteristics such as bandwidth, propagation delay, queuing delay and the network's internal packet size can be derived. The use of bursts of packets enables buffer size and re-sequencing characteristics to be determined.

14 Claims, 6 Drawing Sheets

METHOD AND APPARATUS FOR TESTING A PACKET-BASED NETWORK

TECHNICAL FIELD

The present invention relates to a method and apparatus for testing a packet-based communications network such as a computer network.

BACKGROUND

In packet-based networks, it is often desired to test communications between two specific nodes on the network. This can generally be effected from a first one of the nodes by requesting the other node to 'loop-back' a test packet sent from the first node. The first node, on receiving back the test packet, can thereby ascertain not only that communication is possible with the other node, but also the round trip time for the packet. Typically such a test would be performed by an instrument such as the HP 4982A LAN protocol analyzer (available from Hewlett-Packard Company, Palo Alto, Calif.) connected to the network at the first node.

Inter-networking protocols such as the ARPA Internet Protocol (IP) may also provide a facility for determining reachability and round trip time by use of a looped-back test packet. Thus, in IP networks the Internet Control Message Protocol CiCMP) allows control and information messages, including echo request and echo reply messages, to be passed in the data portion of IP datagrams between IP software on different hosts and gateways. Other messages allowed by ICMP include timestamp request and timestamp reply messages which permit a transit time estimate to be made in both transit directions. Certain computer operating systems such as the Hewlett-Packard HPUX operating system permit users to send ICMP echo requests using a command named "ping" with the users being able to specify the number and size of test packets for which round trip times are returned.

It may also be noted that in the ARPA Transmission Control Protocol (TCP), a similar measurement is continually made as part of the transmission control process. More particularly, the round-trip time is measured between the transmission of a packet and receipt back of an acknowledgement from the destination node; this round-trip time is averaged continually into a smoothed round-trip time estimate which is then used to control the retransmissions time-out parameter RTO.

The use of looped-back test packets has thus been restricted to determining the directly-observable round-trip time characteristic of the transmission path between two nodes.

It is an object of the present invention to permit further network characteristics to be determined from the operation of transmitting packets between two nodes, these characteristics being those which are not discernible from the transmission of a single packet between the nodes.

DISCLOSURE OF THE INVENTION

According to one aspect of the present invention, there is provided a method of testing a packet-based network to ascertain characteristics of packet transmission between first and second nodes on the network, said method comprising the steps of transmitting packets between said nodes, receiving the packets at one said node, and correlating packet transmission and reception to derive correlation data indicative of a said transmission characteristic, characterised in that said packets are transmitted as a sequence in which the packets are in a predetermined relationship to each other, said correlation data being so derived as to be sensitive to this relationship whereby to enable a characteristic of transmission to be determined that is unobservable from the passage of a single packet.

Preferably, at least one of the sequence parameters comprising inter-packet spacing and packet size, varies through said sequence in accordance with said predetermined relationship.

In one test according to the invention, said sequence of packets comprises for each of a multiplicity of packet sizes, a respective plurality of packets, the packets of said sequence being transmitted in isolation from each other.

The correlation data for this test will comprise the minimum and/or the mean packet journey time for each packet size. Where the minimum journey times are derived, these are preferably graphically displayed against packet size; the slope of a straight line placed through the points on this graphical display will give an indication of the network bandwidth whilst the intercept of the same straight line on the time axis will provide an indication of propagation delay. Of course, the minimum journey times could be processed computationally in order to derive the same network characteristics. Where the correlation data includes both the minimum and the mean journey times, graphical display of both against packet size enables the mean queuing time for packets transmitted between the nodes to be derived, this queuing time being the difference between the minimum and mean times for any particular packet size; again, the queuing time could be computed rather than graphically derived. Where the correlation data comprises the mean journey times, graphical display of these times against packet size can provide an indication of the network's internal packet size since if the network splits up an original sequence packet into smaller packets, this will be reflected in an increased journey time which should show up as a step function on the graphical display. Again, the networks internal packet size could be derived by computation from the correlation data.

In another test according to the invention, the sequence of packets transmitted from the first node comprises a succession of isolated packet bursts each made up of a plurality of packets transmitted immediately one after another, the correlation data being so derived as to indicate for each packet position within said bursts as transmitted, the average packet loss rate. If the minimum buffer size in the transmission path between the nodes under consideration is less than the number of packets included in each burst, the loss rate of packets should increase significantly as the buffer size is exceeded by packets occurring later in each burst. This test therefore enables the minimum internal buffer size to be determined.

In a further test according to the invention the sequence of packets transmitted comprises at least one isolated packet burst made up of a plurality of packets that are transmitted immediately one after another and are of decreasing size through the packet; in this case, the correlation dam is derived so as to indicate any difference in packet sequencing between the transmitted and received bursts. Such re-sequencing may be present where the network includes devices that prioritise short packets.

BRIEF DESCRIPTION OF THE DRAWINGS

Three network tests according to the invention, and test apparatus embodying the invention, will now be particularly described, by way of non-limiting example, with reference to the accompanying diagrammatic drawings, in which.

BEST MODE FOR CARRYING OUT THE INVENTION

Figure 1:
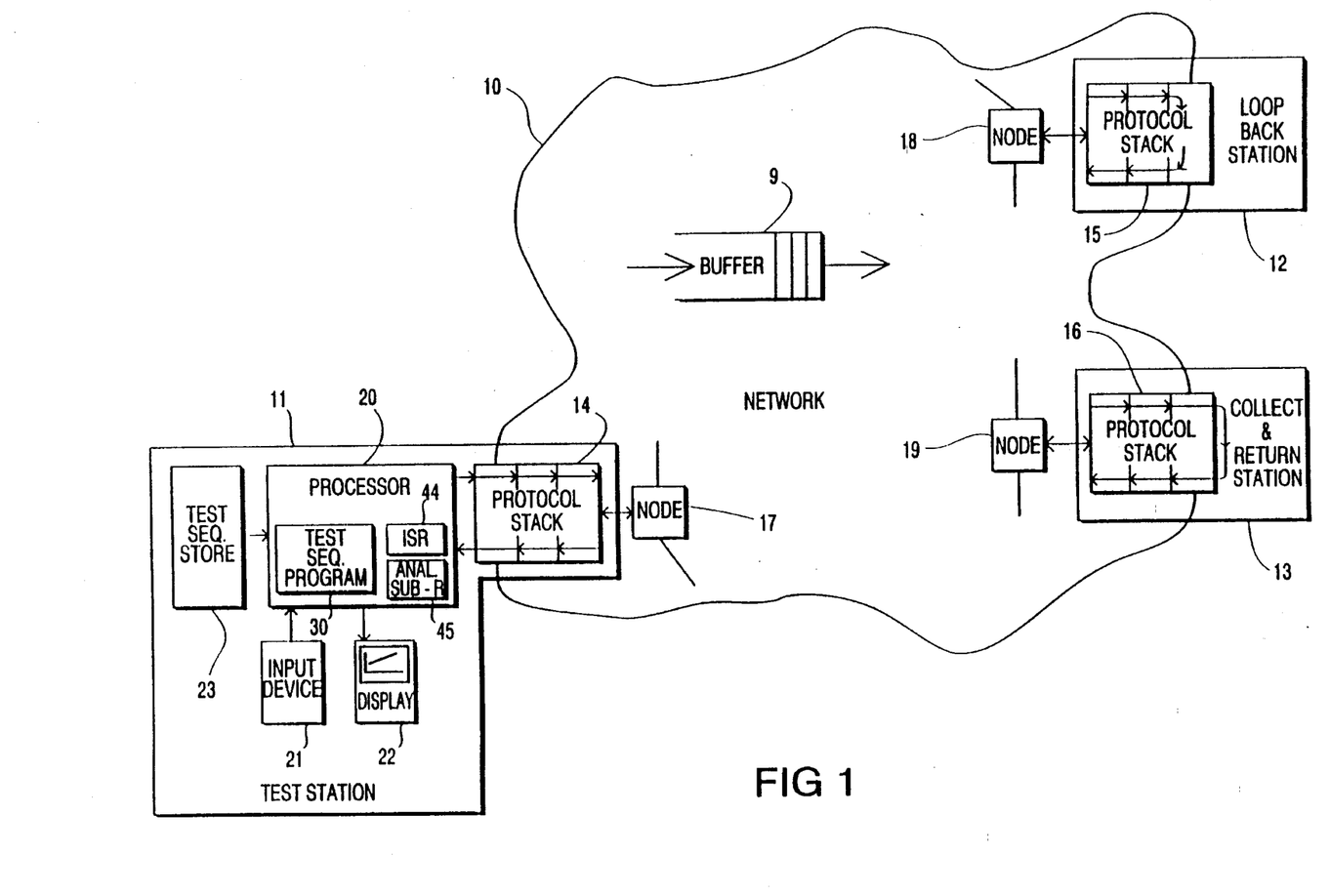
FIG. 1 is a diagram illustrating use of the test apparatus to ascertain characteristics of a network between two given network nodes.

FIG. 1 illustrates a packet-based communication network 10 to which three stations, 11, 12 and 13 are connected at respective network nodes 17, 18 and 19.

The network 10 will generally be made up of one or more links operating to the same or different protocols and will typically include a number of queuing devices such as bridges and gateways, generally depicted by the buffer 9 in the FIG. 1 network. These devices serve to queue packets received at the devices pending appropriate processing of the packets (for example routing to the appropriate network link). The different links of the network will typically operate at different speeds with different internal packet sizes.

The stations 11, 12 and 13 interact with the network 10 through respective protocol stacks 14, 15 and 16, which will generally be provided by communications software running on a processor of the associated station (this processor may be either a dedicated communications processor or a central processor of the station, running in a multi-tasking mode). The protocol stacks may be of any form suitable for the particular links to which the corresponding stations are connected. Implementations of such protocol stacks are well known in the art and will therefore not be described in detail; however, these stacks may include, by way of example, the TCP/IP protocol suite, that is, the Transmission Control Protocol/Internet Protocol suite (for a further description of TCP/IP see, for example, "Internetworking with TCP/IP", by Douglas E. Comer, second edition 1991, Prentice-Hall International, Inc). The lower protocol levels may be in accordance with the IEEE 802.2 link level protocol and appropriate ones of the IEEE 802.3/4/5/6 physical layer protocol standards. Although only three protocol layers have been illustrated for each stack, 14, 15 and 16 in FIG. 1, this is purely done to simplify illustration and more or less protocol layers may be present. As will become clear below, in relation to the network characteristic measurements to be described, at least pan of each protocol stack is within the network 10.

Station 11 is a test station incorporating the test apparatus embodying the present invention. The test station 11 is operative to assess the characteristics of the transmission path between the test station and a remote station (hereinafter, the target station) by sending out sequences of test packets to the target station. In the preferred implementation of the invention, the target station is arranged to loop back the test packets to the station 11; in FIG. 1, station 12 constitutes such a target station effecting test packet loopback (for example, stations 11 and 12 may both operate the IP protocol and the test packets transmitted by the station 11 may either be echo request or timestamp request messages under the ICMP protocol to which station 12 will respond accordingly). The station 11 on receiving back the test packet sequence, correlates the transmission and reception of the test packets in order to derive characteristics of data transmission across the network 10 between the test and target stations 11 and 12. Station 11 is, for example, constituted by a portable instrument which may be moved between different nodes on the network to measure transmission characteristics between various nodes.

Station 11 comprises a program-controlled processor 20 operative to run a main test sequence program 30, an input device 21 such as a keyboard, a graphical output device 22 and a test sequence store 23 containing sequence specifications for a number of different test packet sequences. Each test sequence specification specifies sequence parameters such as packet size, packet identity, inter packet gap and packet ordering. In response to user input through the device 21, the processor 20 is operative to run the test sequence program 30 to transmit a test packet sequence corresponding to a selected one of the specifications held in store 23, to a user specified target station for loop back to the test station 11. In transmitting packets to the target station, the test sequence program 30 utilizes the services provided by the protocol stack 14 to send and receive packets over the network 10. The basic service provided by the protocol stack 14 is to transmit a test packet of specified length and including specified packet D to a specified remote station with a loop back request indication in the packet header. Upon the packet being returned to the protocol stack 14, an interrupt is generated to the processor 20.

The main test sequence program is operative to carry out any required timing of packet transmission and receipt, or if such a facility is provided by the protocol stack (as with timestamp request messages of the ICMP protocol), to arrange for the stack to provide appropriate timing. In addition, the test sequence program will correlate data on the transmitted and received packets, analyze this data, and output the analysis results to the user via the display 22.

Figure 2:
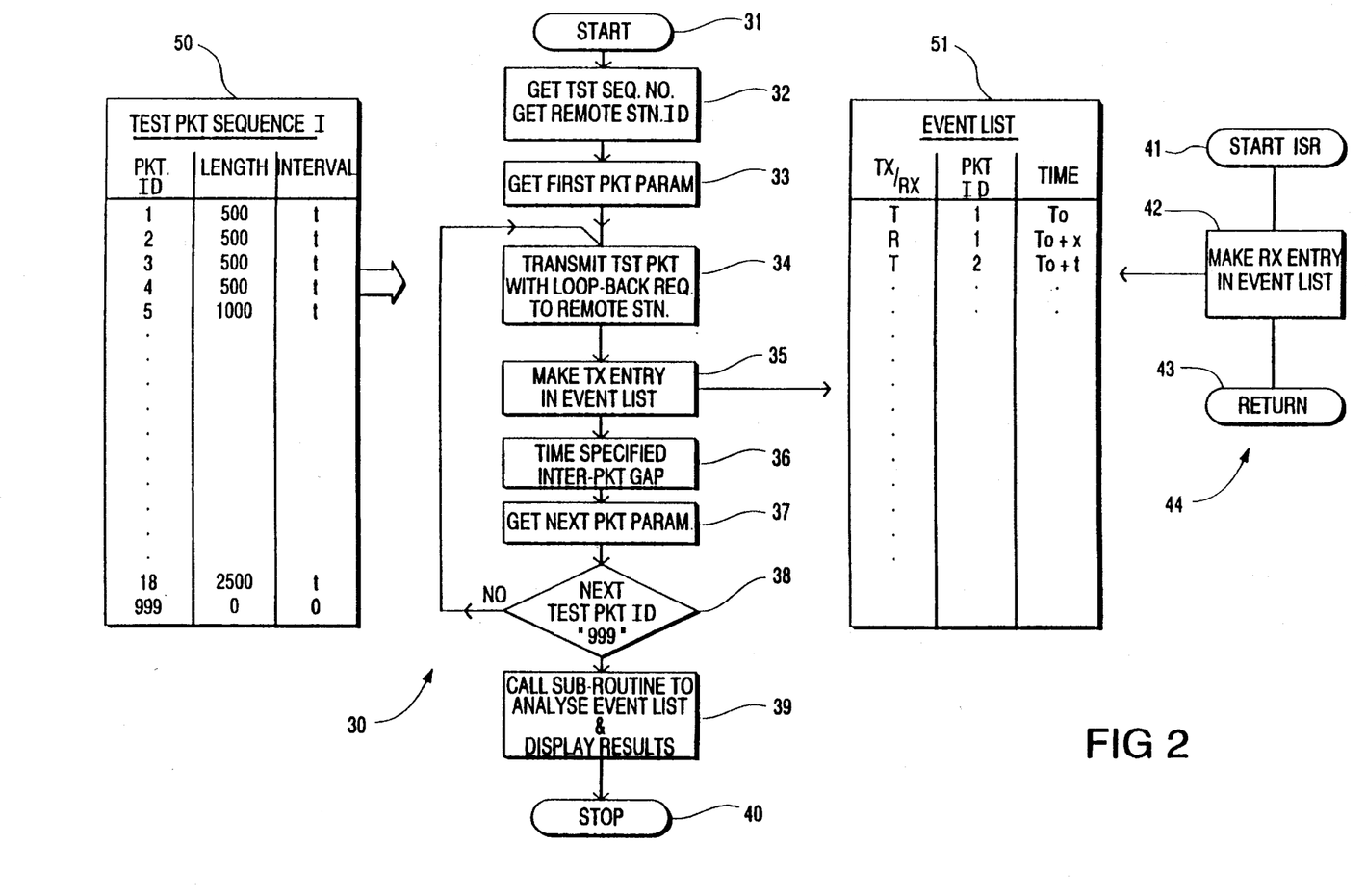
FIG. 2 is a diagram illustrating a main test sequence program of the test apparatus and associated data structures.

The test sequence program 30 will now be considered in more detail with reference to FIG. 2. As noted above, the program 30 is intended to send out a sequence of test packets to a specified remote station for loop back with the parameters of the test sequence being in accordance with a selected one of a plurality of test packet sequence specifications held in the store 23. Each test packet sequence specification can be represented as a list 50 containing for each of a series of test packets, a packet ID number, the length of the packet in bytes and the interval that is to follow the packet before the next packet in the sequence is transmitted. The list of test packets is terminated by an entry giving a packet ID of "999".

In addition to the test packet sequence list 50, the test sequence program also makes use of a data structure in the form of an event list 51. This event list lists in time order the transmission and reception of test packets by the station 11. For each event the list contains an indication of whether or not the event concerned is the transmission or reception of a packet CrX/RX in list 51 of FIG. 2), an indication of the ID number of the packet concerned, and the time of the relevant event (packet transmission or reception). Transmission events are entered in the event list 51 by the main test sequence program 30, whilst reception events are entered into the list 51 by an interrupt service routine 44, initiated by the interrupt produced by the protocol stack 14 whenever a packet is received.

The general operation of the test sequence program 30 will now be described:

Upon initiation of the test sequence program (block 31) the user is asked to enter the identity of the test sequence it is wished to run and also to identify the remote station to which the test packets are to be sent for loop back (block 32). Next, the test sequence program 30 retrieves from the relevant test packet sequence fist 50 the parameters of the first test packet of that sequence (block 33). Thereafter the program 30 controls the transmission of a test packet to the specified remote station using the protocol stack 14. The transmitted test packet will include a packet ID number of 1 and be of a length specified in table 50 (block 34). As soon as the protocol stack 14 has been instructed to transmit the test packet, an entry is made in the event list 51 recording the fact that packet number 1 has been transmitted at a particular time (block 35).

Next, the program 30 times an interval corresponding to that set out in the list 50 for packet just transmitted, this interval being the desired delay before the next packet is sent (block 36). At the end of this time out, the parameters of the next packet to be transmitted are fetched from the list 50 (block 37); except in the case where the ID number of this next packet is "999", the program now loops back to block 34 to send this next packet.

The loop constituted by blocks 34 to 38 is thereafter repeated until all the test packets of the current test sequence have been sent. In due course, the end-of-sequence packet with its ID number set to "999" is encountered and at this point the program passes from block 38 to block 39. Block 39 concerns the analysis of the event list and the display of results to the user. Since the process of analysis and display of results will be dependent on the test packet sequence concerned, a separate analysis and display routine 45 will be called by program 30 in dependence on the test sequence concerned. After the analysis and display sub-routine has terminated, the main test sequence program 30 itself terminates (block 40).

Execution of the main test sequence program 30 is interrupted each time a packet is received by the protocol stack. When this occurs the interrupt service routine 44 is run (block 41) and simply involves an entry being made in the event list to record the receipt back of a test packet, the entry identifying the test packet concerned and its time of receipt (block 42). Thereafter the interrupt service routine is terminated (block 43) and the control is returned to the main program.

The time stamping of packet transmission and reception as recorded in the event list is effected from a common clock run by the processor 20, this being true whether the time stamping is effected externally of the protocol stack 14 or as part of the services provided by the stack (in the latter case, the transmit timestamp of a test packet may be entered in the event list at the same time as the receipt timestamp, rather than earlier, as both will generally be available together from the stack on receipt back of the test packet).

The timing of the inter-packet gap, in block 36 of the main program generally does not require significant accuracy, so that this timing can be done in software with any extension of the interval due to the running of the interrupt service routine 44, being small enough to be ignored. As will become clear below, the main purpose of timing an inter-packet gap is that in certain cases adjacent packets are required to influence the network independently of each other and therefore need to be isolated by a sufficient time interval.

Influence of Network on Packet

When a test packet is sent out over the network to a particular remote station and looped back to the transmitting station, its round trip journey time will depend on a number of factors. More particularly, the round trip journey time will depend on packet length because timing is normally effected between start of packet transmission and conclusion of packet reception, so that the longer a packet is, the greater its round trip journey time. Furthermore, the journey time will also depend on the protocol stack level at which the timing takes place—if timing is effected at one of the lower protocol stack levels, then the journey time will be less than if the timing is effected at a higher level. Similarly, the round trip journey time will be affected by the level in the protocol stack at which loop back is effected at the remote station; generally it is possible to effect loop back both at the link level layer and at the transport layer or higher and, again, the higher the loop back layer, the greater the journey time. It is for this reason that in FIG. 1, the protocol stacks 14, 15 and 16 have been shown as at least partially within the boundary of the network 10. Another factor affecting the round-trip journey time is the speed of each link taken by the packet. A still further factor is the amount of queuing experienced by the packet as it passes through queuing devices such as bridges and gateways. The internal packet size used by the links in the network may also effect round-trip journey time, because if a packet as sent must be split up into several smaller packets for transmission over one or more of the links before being reassembled, then there is a greater likelihood that the greater number of reduced-sized packets will be subject to some delay. Another factor that may influence journey time is the length of the packet as compared to other packets on the network because certain devices on the network may be arranged to give priority to short packets and this could significantly influence the round-trip journey time of a test packet. A test packet may also be subject to other influences such as being lost or being duplicated.

Whilst the basic round-trip journey time of a test packet can be directly measured, the underlying network parameters that may influence journey time cannot be detected from the passage of single test packet across the network and it is for this reason that the present apparatus is arranged to send out sequences of test packets.

First Test Method

Figure 3A:
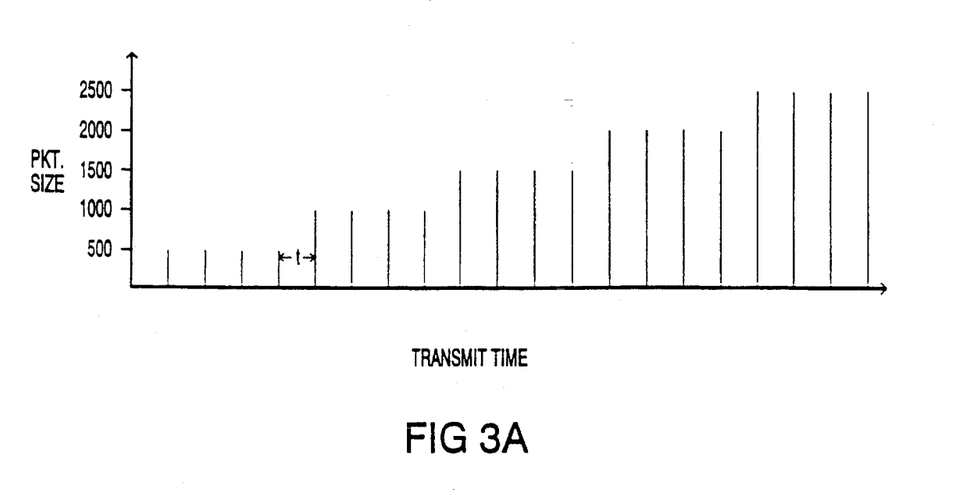
FIG. 3A illustrated a first test sequence of packets for use in carrying out a first one of the network tests.
Figure 3B:
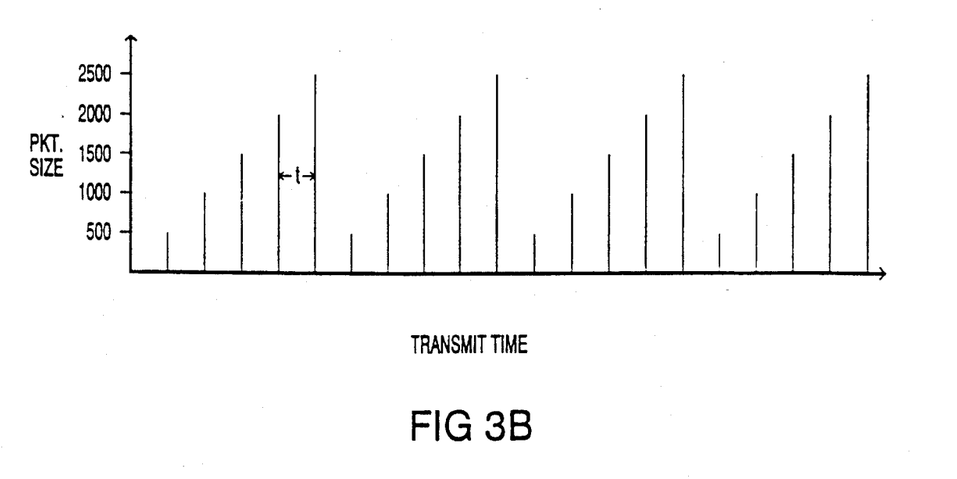
FIG. 3B illustrates a second test sequence of packets for use in the first network test.

Turning now to a consideration in detail of a first test carried out by the apparatus of the present invention, reference is made to FIGS. 3A and 3B which illustrate two possible test packet sequences for use in this test. More particularly, in FIG. 3A a first test sequence is illustrated in which twenty test packets are sent comprising four packets for each of five different sizes ranging from 500 bytes to 2,500 bytes. Each test packet is separated from its neighbours by a time interval "t". The time interval "t" is chosen such that each packet is isolated from its neighbours in the sense that any effect on the network caused by one packet has disappeared by the time the next packet is transmitted.

The test sequence shown in FIG. 3B is similar to that shown in FIG. 3A and includes the same test packets but arranged somewhat differently into four sets of five differently sized packets. However, again the packets are each isolated from each other by a time interval "t".

Either of the test packet sequences shown in FIGS. 3A and 3B may be used in carrying out the first test. The test packet sequence list 50 illustrated in FIG. 2 shows the list entries for the first few packets of the FIG. 3A sequence.

To carry out the first test, the test sequence program 30 is run and the user chooses either the test sequence of FIG. 3A or of FIG. 3B and identifies the remote station concerned. Thereafter, the program 30 transmits the test sequence and, together with the interrupt service routine 44, builds up the event list 51 indicating the time of transmission and receipt of the various test packets of the selected test sequence. Once all the packets have been transmitted, the test program 30 calls the appropriate analysis and display sub-routine. For the first test, this sub-routine is operative to analyze the event list and provide a further list of packet identity number against round-trip time, this information being readily derived by subtracting the time of transmission of a packet from its time of receipt, as recorded in the event list. Then for each packet size involved in the test packet sequence, the sub-routine derives a minimum and mean round trip time and these values are graphically displayed against packet size on the output device 22.

Figure 4:
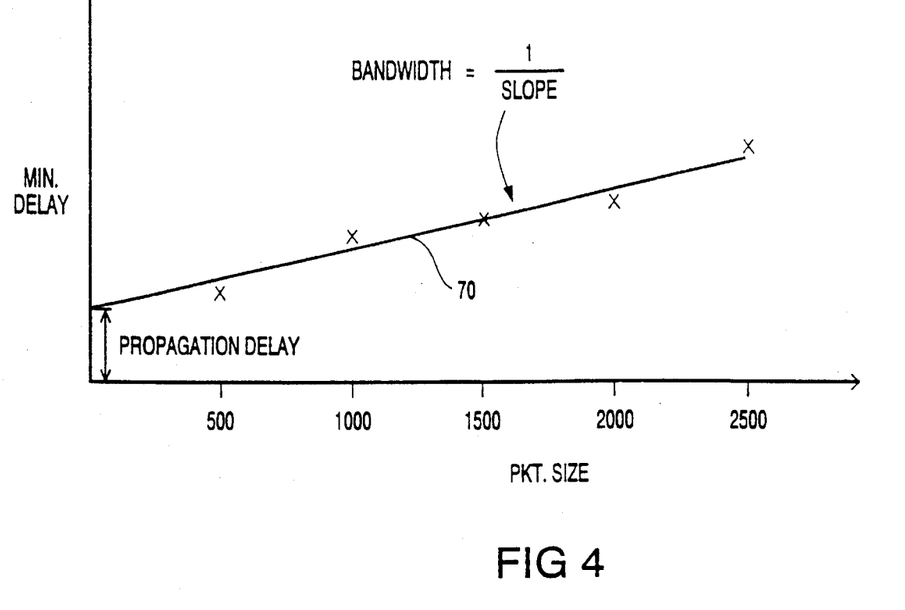
FIG. 4 is a graph of minimum packet delay against packet size, derived by the first network test.

FIG. 4 shows the graph of minimum delay against packet size for typical test results. As can be seen a straight line 70 has been plotted through the minimum delay values. The intercept of the line 70 on the minimum delay axis gives the overall propagation delay between the test station and the remote station 12 (that is, the delay that a zero length packet would experience without queuing). This is so because provided that a sufficient number of test packets of each size are submitted, it may be expected that at least one of these packets will pass through the network without queuing and it will be this packet which records the minimum round-trip time.

The FIG. 4 graph can also be used to obtain an estimate of the bandwidth between the test station and the remote station 12 by considering the minimum delay line 70 to be a straight line satisfying the general equation:

Overall delay=(Pacet size/Bandwidth)+Propagation Delay

In this case, the bandwidth is the reciprocal of the slope of line 70. In fact, of course, there will generally be a plurality of network hops between the test station and remote station 12 each with its own bandwidth and in these circumstances taking the reciprocal of the slope of the line 70 as the bandwidth is equivalent to saying that:

(1/Bandwidth)=(1/b1+1/b2+. . . 1/bn)

where b1, b2 . . . bn are the bandwidths of all the hops in the path. This will only produce a bandwidth estimate close to accurate if there is one hop in the path that is significantly slower than all the others. Where this is not the case, the estimate may be somewhat inaccurate (the inaccuracy arises because no account is taken of the fact that for a multi-hop path, the intermediate nodes will delay onward transmission of a packet until the whole packet has been received).

Figure 5:
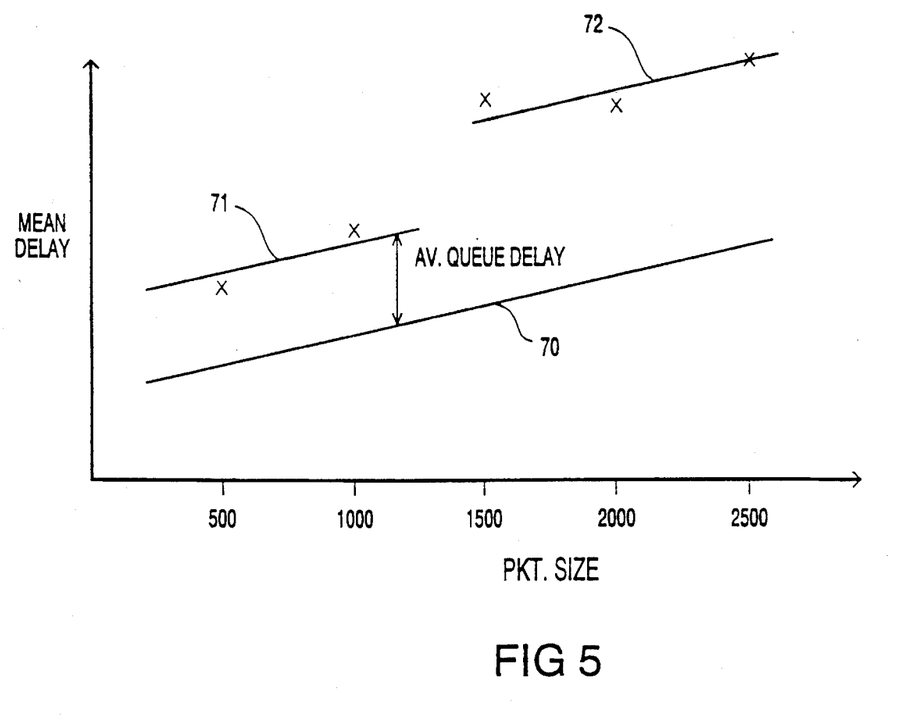
FIG. 5 is a graph of mean packet delay against packet size, derived by the first network test.

The graph of mean delay against packet size shown in FIG. 5 reveals further characteristics of the transmission path between the stations 11 and 12. This graph shows a fragmented line 71, 72 drawn between the mean delay points on the graph; in addition the minimum delay line 70 of FIG. 4 is also shown on the FIG. 5 graph. The difference between the mean and minimum round-trip time delays for the various packet sizes provides an indication of the average queuing delay for each size of packet. The discontinuity in the mean delay line 71, 72 results from the fact that the internal packet size of one or more of the network links has been exceeded by the larger of the transmitted test packets, so that the test packets have been segmented and subject to greater delay in queuing devices of the network. Thus, from FIG. 5 it can be deduced that in the transmission path followed by the test packets between the stations 11 and 12, one or more of the network links has an internal packet size greater than 1000 bytes, but less than 1500 bytes.

In addition to the above described network characteristics that can be derived from the first test (that is bandwidth, propagation delay, average queuing delay and internal network packet size) further characteristics can be derived from the event list 51. These further characteristics include packet lost rate and packet duplication rate.

Instead of, or additionally to the graphical displays illustrated in FIGS. 4 and 5, the sub-routine called by the main program 39 for the purpose of analyzing the event list can be arranged to calculate the various network characteristics described above as being derived from the display graphs.

Second Test Method

Figure 6:
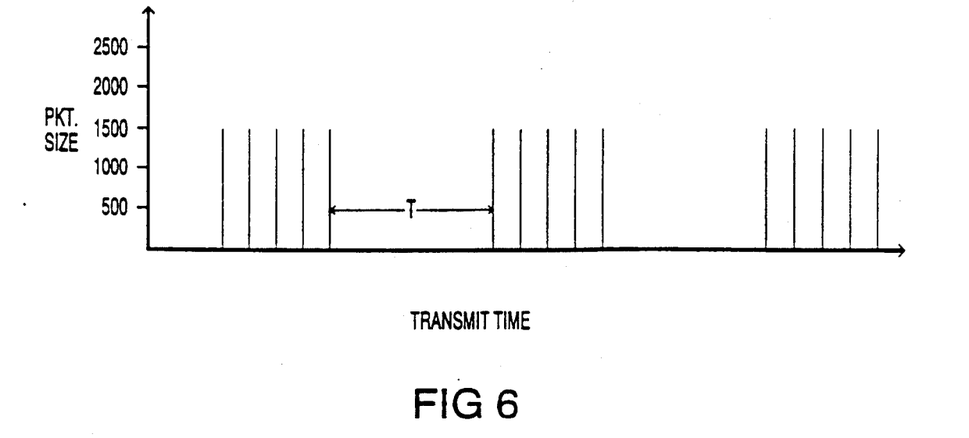
FIG. 6 illustrates a test sequence of packet bursts for use in a second one of the network tests.

The second test implemented by the test apparatus embodying the present invention utilizes a test packet sequence of the form illustrated in FIG. 6. In the FIG. 6 test sequence, a plurality of bursts of back-to-back test packets are provided, each burst being isolated from the other bursts by interval T, such that the effect of one burst on the network has subsided before the next burst is sent. As illustrated, the test packets may all be of the same duration, although for the purposes of the second test, this is not necessary (indeed, the test sequence of FIG. 8 used for the third test described below can also be used for the second test, though the length of the test packets varies through each burst).

The second test is carried out by running the main test sequence program 30 in the manner described above for the first test, except that now the test packet sequence list corresponding to FIG. 6 is accessed by the programme and used to generate the appropriate test sequence. Furthermore, analysis of the event list generated by the FIG. 6 test sequence is affected by a sub-routine specific to the second test.

The purpose of the second test is to identify the minimum buffer length in the transmission path between the test station and the selected remote station 12; this is achieved by saturating the buffer such that packets are lost. In order to achieve the desired saturation, the test sequence includes bursts of packets, each burst effectively being one run through of the second test.

In analyzing and displaying the results of the second test, the event list is processed to determine the mean loss rate of packets for each packet send position in each test sequence burst. The results of this processing are then displayed on the display 22 in the form of a graph plotting percentage of packets received against send position in burst, as illustrated in the FIG. 7.

Figure 7:
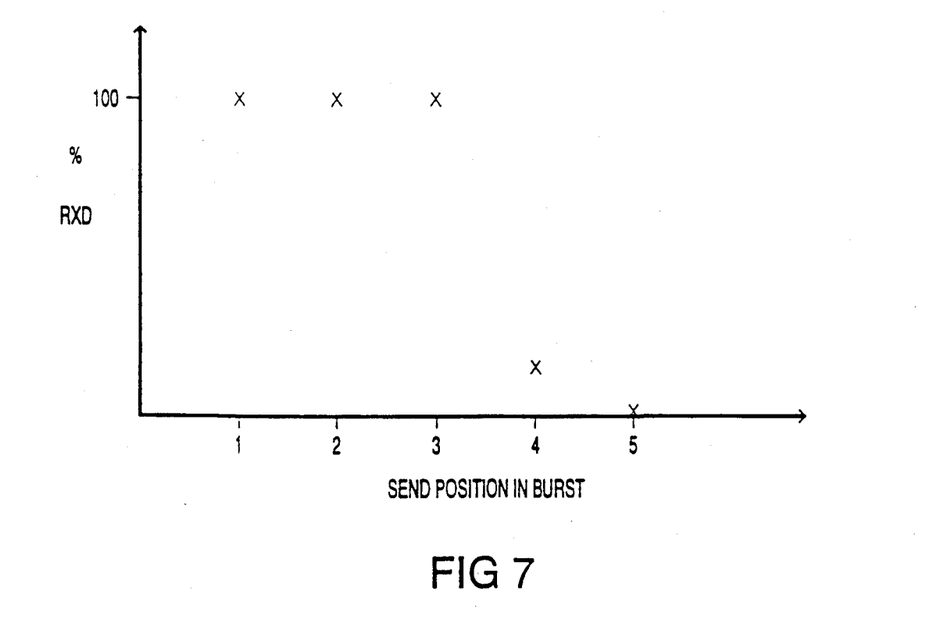
FIG. 7 is a graph derived by the second network test and from which the minimum network path buffer size can be determined.

In FIG. 7, packets in the first three positions in a burst are shown as being received at a near 100% rate; however, packets in the fourth and fifth position in a burst are only rarely received. A graph of this form provides a strong indication that there is a buffer in the transmission path between the stations 11 and 12 which can only hold three packets before over-flowing. It will be appreciated that not only can this information be derived graphically from the results of analyzing the event list, but it would also be possible to process the analyzed results to derive such an indication.

Third Test Method

Figure 8:
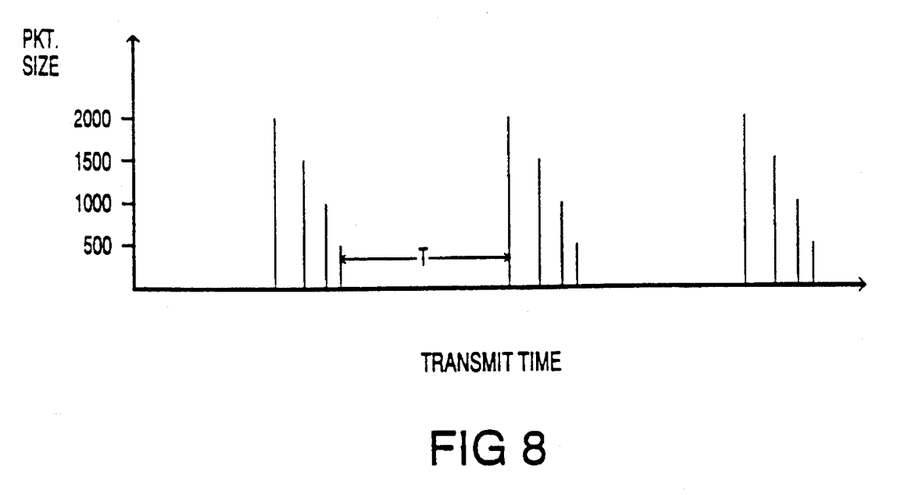
FIG. 8 illustrates a test sequence of packet bursts for use in a third one of the network tests.

The third test implemented by the test apparatus according to the invention is intended to ascertain whether any re-sequencing of packets takes place in transmission between the stations 11 and 12. To this end a test sequence of a form illustrated in FIG. 8 is used. As can be seen, the FIG. 8 test sequence comprises a plurality of test packet bursts isolated from each other by a time interval T. Within a burst, the packets are of decreasing size and are sent back-to-back. A test sequence of this form is likely to identify any re-sequencing behaviour of the network because such behaviour normally involves giving priority to shorter packets and these packets are included towards the end of each burst; if re-sequencing occurs, then it may be expected that the shorter packets will be received earlier in each burst.

The third test is carried out by running the main test sequence program 30 in the manner described above for the first and second test, the primary difference being the program now utilizes a test packet sequence list corresponding to FIG. 8 to control the transmission of test packets. Furthermore, the sub-routine for analyzing and displaying the results of the event list generated by the third test is specific to the third test.

Figure 9:
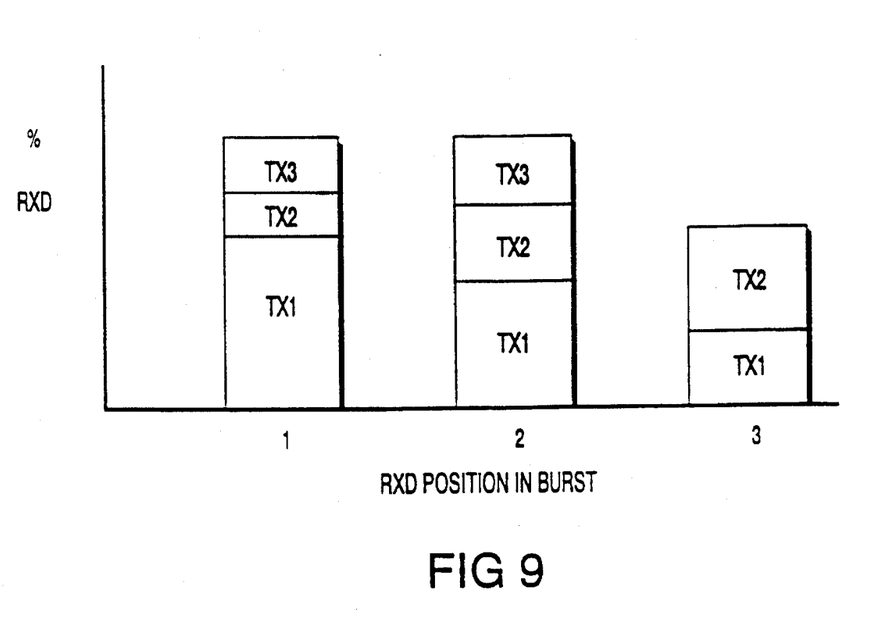
FIG. 9 is a graph derived by the third network test and from which any packet re-sequencing can be identified.

This analysis and display sub-routine is arranged to derive for each receive position in a burst, the mean percentage of packets received by their origin in the transmitted burst. The analysis results are displayed on display 22 in a graph of the form illustrated in FIG. 9. Thus, it can be seen that the first position in a burst received back by the test station 11 is primarily occupied by the first test packet sent out in a burst, but that in addition, the first receive position is also occupied by a small percentage of second and third packets sent out in a burst. It may be deduced from the FIG. 9 graph that re-sequencing of packets does take place over the network path between stations 11 and 12 and that this re-sequencing effects packets at least as large as 1500 bytes (the size of the second test packet in each burst).

Variants

Various modifications and changes to the described test apparatus and methods are, of course, possible. Thus, for example, instead of arranging for each test packet to be looped back by the remote station, the same information regarding network characteristics as derived above using looped back test packets can be derived by one way transmission of the test packet sequences with the remote station collecting each test packet and noting its time of receipt. Such an arrangement is illustrated by the collect and return station 13 in FIG. 1. Because analysis of the test results requires, at least for some of the tests, a comparison of the time of transmission and of receipt of test packets, the time stamping effected by the collect and return station 13 must be co-ordinated with the transmission time stamping effected by the test station 11. This can be achieved in a number of ways, for example, by arranging for each station to run the Network Time Protocol which serves to synchronize clocks at the stations with a master clock system. After the collect and return station 13 has generated a receive event list similar to the event list 51 of FIG. 2, this list can be returned at the completion of the test sequence to the test station 11 for analysis with the event list generated at the test station at the time of packet transmission.

In fact, it is generally not necessary to have the test and target station clocks closely synchronized with each other. The reason for this is that much of the desired information can be derived by looking at variations in trip time, rather than the actual value of trip time. Trip time variations can be easily determined by knowing the time of transmission from the test station 11 and by having a constant rate clock at the collect and return station 13.

Because the provision of a loop back facility at a network station is very common, carrying out the above described tests using packet loop back is preferred over the collect and return approach embodied by station 13, since in the latter case, special software will need to be provided at the station it is wished to equip with this facility.

Certain network protocols such as the IP protocol with its associated ICMP protocol, provide a loop facility with time stamping at the remote station as well as at the originating station (for IP networks, this facility is provided by ICMP Timestamp messages). In this case, it is possible to derive information on each direction of transit between test and target stations, This generally involves an estimate being made regarding clock offset between the test and target station clocks, this offset being estimated assuming a symmetrical path between the two machines; if this assumption is not approximately correct, this will normally show up as differing values for bandwidth in the two directions.

We claim:

1. A method of testing a packet-based network to ascertain characteristics of packet transmission between first and second nodes on the network, said method comprising the steps of transmitting packets between said first and second nodes; receiving the packets at one of said nodes; and correlating packet transmission and reception to derive correlation data indicative of a first of said transmission characteristics; transmitting said packets as a sequence in which the packets are in a predetermined relationship to each other with at least one parameter of the packets in said sequence varying over the sequence; deriving said correlation data so as to relate the correlation data to one parameter of said at least one parameter; and determining a second of said characteristics of transmission by examination of the relation between the correlation data and said parameter over said sequence.

2. A method according to claim 1, wherein said at least one parameter comprises at least one of inter-packet spacing, packet size and packet position sequence.

3. A method according to claim 2, wherein said at least one parameter is packet size, said sequence of packets comprising for each of a multiplicity of packet sizes, a respective plurality of packets, the packets of said sequence being transmitted in isolation from each other.

4. A method according to claim 3, wherein said correlation data comprises the minimum packet journey time for each packet size, said minimum journey time being graphically displayed against packet size whereby to enable the bandwidth and/or propagation delay between said first and second nodes to be determined.

5. A method according to claim 3, wherein said correlation data comprises the minimum packet journey time for each packet size, said method further comprising the step of processing said correlation data to derive the network bandwidth and/or propagation delay between said first and second nodes.

6. A method according to claim 3, wherein said correlation data comprises the mean packet journey time for each packet size, said mean journey times being graphically displayed against packet size to enable the internal network packet size to be determined.

7. A method according to claim 3, wherein said correlation data comprises the mean packet journey time for each packet size, said method further comprising the step of processing said correlation data to derive the internal network packet size.

8. A method according to claim 3, wherein said correlation data comprises the minimum and mean packet journey times for each packet size, said minimum and mean journey times being graphically displayed against packet size whereby to enable the mean queuing delay between said first and second nodes to be determined.

9. A method according to claim 3, wherein said correlation data comprises the minimum and mean packet journey times for each packet size, said method further comprising the step of processing said correlation data to derive the mean queuing time between said first and second nodes.

10. A method according to claim 2, wherein said at least one parameter is inter-packet spacing and packet position said sequence of packets comprising a succession of isolated packet bursts each made up of a plurality of packets transmitted immediately one after another, said correlation data indication for said at least one parameter expressed as packet position within said bursts as transmitted, the average packet loss rate whereby to enable the minimum buffer capacity between said nodes to be determined.

11. A method according to claim 2, wherein said at least one parameter is inter-packet spacing and packet position said sequence of packets comprising at least one isolated packet burst made up of a plurality of packets that are transmitted immediately one after another and are of decreasing size, said correlation data indicating any difference in packet sequencing between the said at least one burst as transmitted and as received.

12. A method according to any one of the preceding claims, wherein said packets are transmitted from said first node and looped-back at said second node for reception at said first node, said correlation data being derived by comparing packet transmission and reception at said first node.

13. A method according to any of claims 1–11, wherein said packets are transmitted from said first node and received at said second node where reception data is derived indicative of parameters of packet reception at said second node, said reception data being transmitted back to said first node to be used as, or in deriving, said correlation data.

14. Apparatus for testing a packet-based network to ascertain characteristics of packet transmission between first and second nodes on the network, said apparatus comprising transmission means for transmitting packets between said first and second nodes, receiving means for receiving the packets of one of said nodes, and correlation means for correlating packet transmission and reception to derive correlation data indicative of a first of said packet transmission characteristics; said transmission means being operative to transmit said packets as a sequence in which the packets are in a predetermined relationship to each other with at least one parameter of the packets in said sequence varying over the sequence; said correlation means being operative to derive said correlation data so as to relate it to one parameter of said at least one parameter; and means for determining a second of said packet transmission characteristics of transmission by examination of the relation between the correlation data and said one parameter over said sequence.

* * * * *

UNITED STATES PATENT AND TRADEMARK OFFICE
CERTIFICATE OF CORRECTION

PATENT NO. : 5,477,531
DATED : December 19, 1995
INVENTOR(S) : Neil Howard McKEE et al.

It is certified that error appears in the above-indentified patent and that said Letters Patent is hereby corrected as shown below:

Column 1, line 26, change "CiCMP) to --(ICMP)--.
Column 4, line 1, change "pan" to --part--.
Column 5, line 6, change "CrX/RX" to --(TX/RX--.
Column 7, line 52, change "Pacet" to --Packet--.

Signed and Sealed this

Twenty-seventh Day of August, 1996

Attest:

BRUCE LEHMAN

Attesting Officer     Commissioner of Patents and Trademarks